United States Patent [19]

Yano et al.

[11] Patent Number: 5,238,718
[45] Date of Patent: Aug. 24, 1993

[54] MULTI-LAYERED BLOW-MOLDED BOTTLE

[75] Inventors: Katsumi Yano, Yokohama; Shigemitsu Kambe, Kawasaki, both of Japan

[73] Assignee: Nippon Petrochemicals Company, Limited, Tokyo, Japan

[21] Appl. No.: 706,939

[22] Filed: May 29, 1991

Related U.S. Application Data

[62] Division of Ser. No. 420,164, Oct. 12, 1989, Pat. No. 5,073,420.

[30] Foreign Application Priority Data

Oct. 17, 1988 [JP] Japan .................. 63-259551

[51] Int. Cl.$^5$ .............................. B29D 22/00
[52] U.S. Cl. .................. 428/35.7; 428/36.7; 428/36.8; 428/213; 428/214; 428/355; 428/483; 428/492; 428/519; 428/520; 428/36.92; 525/193; 215/1 C
[58] Field of Search .............. 428/35.7, 36.7, 36.8, 428/213, 214, 355, 412, 483, 492, 517, 519, 36.92; 525/193, 222, 227, 240; 215/1 C

[56] References Cited

U.S. PATENT DOCUMENTS

| | | | |
|---|---|---|---|
| 3,868,433 | 2/1975 | Bartz et al. | 525/285 |
| 4,880,706 | 11/1989 | Mazuera et al. | 428/349 |
| 4,894,289 | 1/1990 | Otawa et al. | 428/483 |

FOREIGN PATENT DOCUMENTS

| | | |
|---|---|---|
| 34210 | 9/1978 | Japan . |
| 18448 | 5/1980 | Japan . |
| 46661 | 11/1980 | Japan . |
| 1335791 | 10/1973 | United Kingdom . |
| 1527611 | 10/1978 | United Kingdom . |

*Primary Examiner*—Ellis P. Robinson
*Assistant Examiner*—Charles R. Nold
*Attorney, Agent, or Firm*—Dilworth & Barrese

[57] ABSTRACT

A multi-layered blow-molded bottle comprising at least two layers of a polyolefin resin (A), at least two layers of an adhesive resin (B) prepared by melt-reacting an olefin polymer ($b_1$) with a rubber ($b_2$) and an unsaturated carboxylic acid or a derivative thereof ($b_3$) in the presence of an organic peroxide to obtain a product and adding a rubber ($b_4$) to the product to melt-mix them with each other, and at least one layer of a barrier resin (C) selected from among polyamide, polycarbonate, polyester, polyvinylidene chloride and saponified ethylene-vinyl acetate polymer resins, which are laminated in the order of A/B/C/B/A.

1 Claim, No Drawings

MULTI-LAYERED BLOW-MOLDED BOTTLE

This is a divisional of copending application Ser. No. 07/420,164 filed Oct. 12, 1989, now U.S. Pat. No. 5,073,420.

BACKGROUND OF THE INVENTION

The present invention relates to a blow-molded bottle useful as a container for food such as soy or salad oil, for alcoholic beverage and soft drink, for detergents, for organic solvents such as benzene, toluene or xylene, or for oil such as gasoline, kerosine, light oil or heavy oil. Particularly, it relates to a multi-layered blow-molded bottle which is excellent in gas-barrier property, stiffness and impact resistance, exhibits a high interlaminar peel strength and satisfies the severe physical requirements necessitated for the use as a large-scale blow-molded bottle such as an automotive gasoline tank.

Up to this time, a polyolefin resin has been generally used as a material for a blow-molded bottle. However, a polyolefin resin is disadvantageously poor in gas-barrier property and solvent resistance, though it is inexpensive and excellent in water resistance and heat sealability.

Accordingly, it has been attempted to laminate a polyolefin resin with various materials for the purpose of improving the various performance such as gas-barrier property and solvent resistance. For example, Japanese Patent Publication No. 49989/1980 (corresponding to British Patent No. 1335791) discloses a process for the production of a multi-layered blow-molded bottle which comprises laminating a layer of a crystalline polyolefin with a layer of a modified crystalline polyolefin having an unsaturated polycarboxylic acid and an anhydride group thereof grafted thereto and a layer of nylon.

Further, multi-layered bottles produced by laminating polyolefin with polyamide by the use of an olefin resin modified with an unsaturated carboxylic acid or an anhydride thereof such as maleic anhydride as an adhesive and various processes for the production thereof have been proposed.

Such bottles and processes are disclosed in, for example, Japanese Patent Laid-Open Nos. 86579/1975, 96878/1976, 125463/1976 (corresponding to British Patent No. 1527611), 150468/1976, 45465/1977, 62574/1977, 21676/1978, 23774/1978, 113678/1979, 91634/1980, 106857/1981, 120345/1981, 11046/1982, 42745/1982 and 125044/1982.

However, the multi-layered bottles of the prior art do not exhibit high adhesion enough to withstand the environmental conditions severer than those of ordinary uses.

Particularly, the environmental conditions of a large-scale fuel container necessitating high impact resistance and adhesion, such as a gasoline tank, are much severer than those of ordinary uses, so that an improvement in the adhesion has been eagerly demanded.

An object of the present invention resides in improving the adhesion of a polyolefin layer to a barrier layer made of a polyamide resin or the like, in which the multi-layered blow-molded bottles according to the prior art are poor.

Another object of the present invention resides in providing a multi-layered blow-molded bottle which is excellent in various characteristics such as moldability, environmental stress-crack resistance (ESCR) and impact resistance.

SUMMARY OF THE INVENTION

The present invention resides in a multi-layered blow-molded bottle comprising at least two layers of a polyolefin resin (A), at least two layers of an adhesive resin (B) prepared by melt-reacting an olefin polymer ($b_1$) with a rubber ($b_2$) and an unsaturated carboxylic acid or a derivative thereof ($b_3$) in the presence of an organic peroxide to obtain a product and adding a rubber ($b_4$) to the product to melt-mix them with each other, and at least one layer of a barrier resin (C) selected from among polyamide, polycarbonate, polyester, polyvinylidene chloride and saponified ethylene-vinyl acetate copolymer resins, said at least five layers being laminated in an order of A/B/C/B/A. Detailed Description of the Invention The polyolefin resin (A) according to the present invention is an α-olefin homo- or co-polymer such as polyethylene, polypropylene, polybutene-1 or poly-4-methylpentene-1. For a large-scale blow-molded bottle, it is particularly preferable to use an ethylene polymer or ethylene-α-olefin copolymer having a density of 0.94 to $0.97 g/cm^3$ or a modified olefin resin obtained by modifying the polymer or copolymer with a slight amount of a free-radical initiator.

The modified olefin resin is preferably prepared by intimately mixing 100 parts by weight of an ethylene polymer or an ethylene-α-olefin copolymer having a density of 0.94 to $0.97 g/cm^3$ with 0.001 to 0.05 part by weight, still preferably 0.005 to 0.03 part by weight of a free-radical initiator in a molten state to carry out the modification.

If the amount of the free-radical initiator to be mixed is less than 0.001 part by weight, no effect will be exhibited, while if the amount exceeds 0.05 part by weight, the fluidity of the modified olefin resin will be unfavorably poor to result in poor moldability.

The ethylene polymer or ethylene-α-olefin copolymer having a density of 0.94 to $0.97 g/cm^3$ can be prepared by polymerizing ethylene, if desired, with an α-olefin in the presence of a Ziegler or Philips catalyst containing at least a titanium compound and/or a chromium compound, if desired, in the presence of hydrogen.

The above polymerization may be carried out by slurry polymerization, vapor phase polymerization or the like, preferably according to a multi-stage method.

It is particularly desired that the resin composition to be blow-molded have a relatively high molecular weight and a wide molecular-weight distribution. The molecular-weight distribution of the resin composition can be widened by, for example, preparing the composition according to a two-stage method wherein a high-molecular weight polymer component having a relatively wide molecular-weight distribution and containing a large amount of short-chain branches is generated in the first stage and a low-molecular weight polymer component having a relatively narrow molecular-weight distribution is generated in the second stage to thereby remarkably improve the blow moldability and ESCR of the composition.

Alternatively, the control of the molecular-weight distribution can be carried out by blending a high-molecular weight resin with a low-molecular weight resin, though it may be carried out by the above two-stage polymerization method.

In the production of a large-scale blow-molded bottle according to the present invention, it is preferable from the viewpoint of the moldability and the retention of the stiffness of the bottle that the polyolefin resin (A) have a melt flow rate (hereinafter referred to as "MFR") of 2g/10 min or below, still preferably 1 g/10 min or below, a melt tension of at least 8g, still preferably at least 10g and an N value of 1.8 to 2.9, still preferably 1.9 to 2.6.

The melt tension is an indicator of the blow moldability. If the melt tension is less than 8g, the drawdown of the parison (drawdown phenomenon) will disadvantageously occur in blow molding to give a molded article having an nonuniform thickness including thin sidewall.

Particularly, it is preferable that the high-density polyethylene to be used in the production of a large-scale blow-molded bottle such as a gasoline tank have an MFR of 0.2g/10 min or below and a melt tension of at least 10g, the latter exhibiting a dependence upon the former.

Further, the N value is also an indication of the moldability. If the N value is less than 1.8, the surface of the resulting molded article will be rough to result in a danger of lowering the value of the molded article.

If the N value exceeds 2.9, the impact resistance will unfavorably be poor.

All N values described in this specification were each determined by extruding a molten resin through a die having a diameter (D) of 2mm and a length (L) of 40 mm (L/D=20) at 210° C. and calculating the value according to the following equation:

$$N \text{ value} = \log(\gamma_{150}/\gamma_{20})/\log(\tau_{150}/\tau_{20})$$

wherein $\gamma$ stand for a shear rate; $\tau$ stands for a shear stress and figures 150 and 20 stand for loads of 150kgf/cm² and 20kgf/cm², respectively.

The adhesive resin (B) to be used in the present invention is a resin prepared by melt-reacting an olefin polymer ($b_1$) with a rubber ($b_2$) and an unsaturated carboxylic acid or a derivative thereof ($b_3$) in the presence of an organic peroxide to obtain a product and adding a rubber ($b_4$) to the product to melt-mix them with each other.

The above olefin polymer ($b_1$) includes polyolefin resins described above as the component (A), medium-, low- or high-pressure, low-density polyethylene and copolymers comprising ethylene and a polar monomer such as vinyl acetate, styrene, (meth)acrylic acid or ester thereof. These olefin polymers may be used alone or as a mixture of two or more of them.

Among them, it is preferable to use at least one ethylene copolymer selected from the group consisting of ethylene-α-olefin copolymers having a density of 0.86 to 0.97g/cm³, ethylene-(meth)acrylate copolymers and ethylene-vinyl ester copolymers.

Particularly, it is effective for a large-scale bottle requiring high adhesion and high mechanical strengths such as stiffness that the polyolefin resin (A) and the base resin of the adhesive resin (B) are of the same kind.

The α-olefin constituting the ethylene-α-olefin copolymer is one having a number of carbon atoms of 3 to 12, preferably 3 to 8, and particular examples thereof include propylene, 1-butene, 4-methylpentene-1, 1-hexene and 1-octane.

Particular examples of the ethylene-α-olefin copolymer include ethylene-propylene copolymers, ethylene-1-butene copolymers, ethylene-4-methylpentane-1 copolymers and ethylene-1-hexene copolymers.

Further, it is particularly preferable to use an ethylene-α-olefin copolymer having a density of 0.86 to 0.91g/cm³ and a maximum peak temperature as determined by differential scanning calorimetry (DSC) of at least 100° C. and containing boiling n-hexane-insoluble matter in an amount of 10% by weight or above owing to its excellent adhesion.

The maximum peak temperature and the content of boiled n-hexane-insoluble matter were determined as follows:

Determination of maximum peak temperature by DSC

A sample of about 5mg is cut out from a 100-μm thick film prepared by hot pressing and accurately weighed. The sample is set on a DSC apparatus, heated to 170° C, kept at that temperature for 15 minutes and cooled to 0° C. at a rate of temperature drop of 2.5° C./min.

Then, the sample is heated up to 170° C. at a rate of temperature rise of 10° C./min.

The temperature of the top of the maximum peak among those appearing during the heating from 0° C. to 170° C. is regarded as the maximum peak temperature.

Determination of the content of boiling n-hexane-insoluble matter

A 200-μm thick sheet is molded by hot pressing. Three sheets of 20mm×30mm are cut out from the sheet and each extracted with boiling n-hexane for 5 hours by the use of a Soxhlet extractor of a double-tube type to take out matter insoluble in n-hexane. The sheets are dried in a vacuum at 50° C. for 7 hours to calculate the content of boiling n-hexane-insoluble matter according to the following equation:

content of boiling n-hexane-insoluble matter (% by weight)=(weight of the sheet after extraction/weight of the sheet before extraction) ×100

Examples of the rubbers ($b_2$) and ($b_4$) include synthetic rubbers such as polyisobutylene, styrene-butadiene copolymer rubbers, butadiene-acrylonitrile copolymer rubbers, polybutadiene rubber, chloroprene rubber, ethylene-propylene copolymer rubber, ethylene-propylene-diene rubber, urethane rubber, silicone rubber, ethylene-vinyl acetate copolymer rubber and liquid polybutadiene rubbers, and natural rubbers. These rubbers may be used alone or a mixture of them and the rubbers ($b_3$) and ($b_4$) may be the same or different from each other.

The amount of the rubber ($b_2$) to be used is 0.5 to 50 parts by weight, preferably 1.0 to 40 parts by weight, still preferably 2.0 to 30 parts by weight, per 100 parts by weight of the olefin polymer.

The amount of the rubber ($b_4$) to be added is 0.5 to 50 parts by weight per 100 parts by weight of the reaction product of the olefin polymer ($b_1$) with the rubber ($b_2$) and the unsaturated carboxylic acid or a derivative thereof ($b_3$). If the amounts of the rubbers used are too small, the adhesive strength will not be sufficiently improved, while if they are too large, the stiffness will be unfavorably poor.

The unsaturated carboxylic acid and derivative thereof ($b_3$) include maleic acid, maleic anhydride, fumaric acid, crotonic acid, itaconic acid, citraconic acid, acrylic acid, methacrylic acid and metal salts, amides, imides and esters of these unsaturated carboxylic acids.

The amount of the unsaturated carboxylic acid or derivative thereof is 0.05 to 10 parts by weight, preferably 0.1 to 5.0 parts by weight, still preferably 0.1 to 3.0 parts by weight, per 100 parts by weight of the olefin polymer ($b_1$).

If the amount of the component ($b_3$) is less than 0.05 part by weight, the adhesion will not be improved effectively, while the use thereof in an amount exceeding 10 parts by weight will unfavorably cause the gelation or coloring of the adhesive resin.

These unsaturated carboxylic acids and derivatives thereof may be used alone or as a mixture of two or more of them.

The adhesive resin according to the present invention is one prepared by melt-reacting the olefin polymer ($b_1$) as described above with the rubber ($b_2$) and the unsaturated carboxylic acid or a derivative thereof ($b_3$) in a predetermined ratio in the presence of an organic peroxide to obtain a product and adding the rubber ($b_4$) to the product to melt-mix them with each other. The equipment to be used in the above melt reaction and melt mixing may be an ordinary kneading machine such as a Banbury mixer, kneader, mixing roll or extruder. The above melt reaction and melt mixing can be easily carried out by using one kneading machine as described above or a combination of those described above. Alternatively, they may be carried out in the presence of a solvent.

The melt reaction and the melt mixing are each carried out above a temperature of the melting point of the polymer used. Generally, they are each carried out at a temperature of 150° to 300° C. with regard paid to the deterioration of the polymer and the rubber and the decomposition temperature of the organic peroxide.

The organic peroxide includes benzoyl peroxide, lauryl peroxide, dicumyl peroxide, tert-butyl peroxybenzoate, 2,5-dimethyl-2,5-di(t-butylperoxy)hexyne-3 and azobisisobutyronitrile.

The amount of the organic peroxide to be used is 0.005 to 2.0 parts by weight, preferably 0.01 to 1.0 part by weight per 100 parts by weight of the olefin polymer.

If the amount of the organic peroxide is less than 0.005 part by weight, the olefin polymer will not be favorably modified, while if the amount exceeds 2 parts by weight, not only any additional effect will hardly be exhibited, but also the olefin polymer will often be decomposed or crosslinked excessively.

The adhesive resin according to the present invention is a composition having a dramatically enhanced adhesive strength which is prepared by melt-reacting the olefin polymer ($b_1$) with the rubber ($b_2$) and the unsaturated carboxylic acid or a derivative thereof ($b_3$) in the presence of an organic peroxide to obtain a product and adding the rubber ($b_4$) to the product to melt-mix them with each other.

Although the reason for the enhancement of the adhesive strength is not apparent, the results obtained by extracting a film made of a reaction product among the components ($b_1$), ($b_2$) and ($b_3$) with a boiling solvent in a Soxhlet extractor for several hours, drying the resulting film in a vacuum and analyzing the dried film for the content of the rubber ($b_2$) by infrared spectroscopy revealed that the rubber ($b_2$) was not extracted with the boiling solvent.

Further, the results obtained by extracting a film made of a composition prepared by adding the rubber ($b_4$) to the above reaction product to melt-mix them with each other in a similar manner to that described above revealed that the rubber ($b_4$) added was extracted with the boiling solvent.

Accordingly, it is estimated that the rubber ($b_2$) might undergo addition reaction with the olefin polymer by the action of the organic peroxide, while the rubber ($b_4$) might be only melt-mixed with it.

According to the present invention, an unmodified olefin polymer may, if necessary, be added to the adhesive resin by dry blending.

The barrier resin (C) according to the present invention is one resin selected from among polyamide, polycarbonate, polyester, polyvinylidene chloride and saponified ethylene-vinyl acetate resins.

The polyamide resin ($C_1$) includes an aliphatic polyamide resins such as nylon 6, 6.6, 6.10, 6.12, 11, 12 or 4.6; aromatic polyamide resins such as polyhexamethyleneterephthalamide, polyhexamethyleneisophthalamide; modifications thereof and mixture of them.

The polycarbonate resin ($C_2$) includes polycarbonates of 4,4-dihydroxyarylalkanes represented by 4,4-dihydroxydiphenyl-2,2-propane (generally called "bisphenol"), among which polycarbonates of 4,4-dihydroxydiphenyl-2,2-propane each having a number-average molecular weight of 15,000 to 80,000 are preferred. These polycarbonate resins may be prepared by an arbitrary process. For example, polycarbonate of 4,4-dihydroxydiphenyl-2,2-propane can be prepared either by bubbling phosgene into 4,4-dihydroxydiphenyl-2,2-propane as a dihydroxyl compound in the presence of an aqueous solution of a caustic alkali and a solvent or by reacting 4,4-dihydroxydiphenyl-2,2-propane with a carbonate such as diphenyl carbonate to carry out transesterification.

The polycarbonate resin may be a homopolymer of one dihydric phenol or a copolymer of two or more dihydric phenols or a blend thereof. Further, the polycarbonate may be partially branched.

Further, a small amount of an alicyclic diol such as 1,4-cyclohexanediol, aliphatic diol such as 1,6-hexanediol or aromatic group-containing aliphatic diol such as p-xylene glycol may be used together with the dihydric phenol.

The polyester resin ($C_3$) is preferably a polyester comprising repeating units containing an aromatic ring, i.e., a polymer or copolymer prepared by the condensation of an aromatic dicarboxylic acid (or an ester-forming derivative thereof) with a diol (or an ester-forming derivative thereof).

The aromatic dicarboxylic acid includes terephthalic, isophthalic, phthalic, 2,6-naphthalenedicarboxylic and naphthalenedicarboxylic acids, bis(p-carboxyphenyl)methane, anthracenedicarboxylic, 4,4'-diphenyl ether dicarboxylic and 1,2-bis(phenoxy)ethane-4,4'-dicarboxylic acids and ester-forming derivatives thereof.

The diol includes aliphatic diols each having 2 to 10 carbon atoms such as ethylene glycol, propylene glycol, 1,4-butanediol, neopentyl glycol, 1,5-pentanediol, 1,6-hexanediol, decamethylene diglycol and cyclohexanediol and long-chain glycols each having a molecular weight of 400 to 6000 such as polyethylene glycol, poly-1,3-propylene glycol and polytetramethylene glycol and mixtures thereof.

Particular examples of the polyester resin ($C_3$) include polyethylene terephthalate, polypropylene terephthalate, polybutylene terephthalate, polyhexamethylene terephthalate, polyethylene 2,6-naphthalate and polyethylene 1,2-bis(phenoxy)ethane-4,4'-dicarboxylate, among which polyethylene terephthalate and polybutylene terephthalate are preferred.

It is preferable that the intrinsic viscosity of the aromatic polyester be 0.4 to 4.0 dl/g, said intrinsic viscosity being determined in a state of a solution of 0.32g of thereof in 100ml of a trifluoroacetic acid (25)/methylene chloride (75) mixture at 25°±0.1° C. An aromatic polyester having an intrinsic viscosity lower than 0.4 dl/g does not favorably exhibit sufficiently high mechanical strengths, while one having an intrinsic viscosity exceeding 4.0 dl/g exhibits poor fluidity in a molten state.

The polyvinylidene chloride resin ($C_4$) is a vinylidene chloride homopolymer or a binary or higher copolymer containing at least 60% by weight of vinylidene chloride.

The monomer to be copolymerized with vinylidene chloride includes vinyl chloride, acrylonitrile, (meth)acrylic acid and esters thereof, butadiene, isobutylene, vinyl acetate, styrene, ethylene, propylene, vinyl alkyl ketone, vinyl ether and maleic acid and derivatives thereof. Particularly, a copolymer comprising 70 to 90% by weight of vinylidene chloride and 10 to 30% by weight of vinyl chloride is preferred. If necessary, the polyvinylidene chloride resin may contain a plasticizer or stabilizer.

The saponified ethylene-vinyl acetate copolymer ($C_5$) (hereinafter referred to as "EVOH") is a polymer prepared by saponifying an ethylene-vinyl acetate copolymer having an ethylene content of 15 to 60 mole % up to a degree of saponification of 90 to 100%.

If the ethylene content is less than 15 mole %, the molding temperature of EVOH and the decomposition temperature thereof will be too close to each other to carry out the molding easily, while if the content exceeds 60 mole %, the gas-barrier property and mechanical characteristics of the obtained bottle will be poor.

Further, if the degree of saponification of EVOH is less than 90%, the mechanical characteristics, oil resistance and water resistance thereof will be poor.

The blow-molded bottle of the present invention is a five-layer blow-molded bottle comprising two layers of the resin (A), two layers of the adhesive resin (B) and one layer of the barrier resin (C) which are laminated in the order of A/B/C/B/A. It is preferable from the standpoint of the mechanical strengths such as stiffness and impact resistance, the retention of bottle performances such as gas-barrier property and economical efficiency that the thickness ratio among the resins (A), (B) and (C) be 0.70~0.98:0.01~0.15: 0.01~0.15 with the proviso that the thickness of the resins (A) and (B) are each a sum total of the two layers.

The bottle of the present invention can be produced by an ordinary blow molding method. The blow-mold bottle according to the present invention may contain a layer of composition comprising a mixture of the resins (A), (B) and (C).

Particularly, rejected products or burrs generated in the molding of the bottle according to the present invention may be used for forming one or two layers among the outer, intermediate and inner layers, which is economically advantageous, because the production cost of the bottle is lowered thereby.

According to the present invention, other material may be used as far as the use thereof is not deviated from the gist of the present invention, said material including other synthetic resins, additives such as pigment, dye, lubricant, antioxidant, ultraviolet absorber and crosslinking agent, and organic or inorganic fillers.

EXAMPLES

Preparation of high-density polyethylene

An ethylene-propylene copolymer having a density of $0.951 g/cm^3$ and a melt flow rate (MFR) of 0.30g/10 min was prepared by the use of a catalyst comprising triethylaluminum and a solid catalyst prepared by ball-milling anhydrous magnesium chloride, aluminum triethoxide and titanium tetrachloride.

100 parts by weight of the above copolymer was melt-mixed with $150 \times 10^{-4}$% by weight of 2,5-dimethyl-2,5-di(t-butylperoxy)hexyne-3 as a free-radical initiator, 0.05 part by weight of calcium stearate and 0.05 part by weight of (2,4-di-t-butylphenyl) phosphate to prepare a high-density polyethylene for the production of a blow-molded bottle [density: $0.951 g/cm^3$, melt flow rate (MFR): 0.15g/10 min, N value: 2.15, melt tension: 12g and die swell ratio: 1.55].

Preparation of adhesive resin 100 parts by weight of high-density polyethylene (density: $0.956 g/cm^3$, melt flow rate: 0.3g/10 min, trade name: Nisseki Staflene E012, a product of Nippon Petrochemicals Co., Ltd.) as the olefin polymer ($b_1$), a predetermined amount (given in Table 1) of polyisobutylene (trade name: Vistanex #140, a product of Esso Chemical Co., Ltd.) as the rubber ($b_2$) and 0.5 part by weight of maleic anhydride as the unsaturated carboxylic acid or derivative thereof ($b_3$) were melt-reacted in an extruder (screw diameter: 50mm, L/D: 26) set at 180° to 220° C. in the presence of 0.05 part by weight of 2,5-dimethyl-2,5-di(t-butylperoxy)hexyne-3 to obtain a product. The same polyisobutylene as that used above as the component ($b_2$) of an amount given in Table 1 was added to this product. The obtained mixture was melt-mixed with the same extruder as that used above to obtain an adhesive resin (B).

EXAMPLES 1 TO 6 AND COMPARATIVE EXAMPLES 1 TO 3

A) high-density polyethylene prepared above (hereinafter abbreviated to "HDPE")

B) adhesive resin prepared above (hereinafter abbreviated to "N")

C) nylon 6 (hereinafter abbreviated to "PA") trade name: Amilan 1046, a product of Toray Industries, Inc.

The above resins (A), (B) and (C) were set on a blow molding machine so as to give a laminated structure of the order of A/B/C/B/A. Thus, a five-layer blow-molded bottle (comprising three kinds of layers) having a capacity of 50l was molded. As comparative Examples, the same procedure as that described above was repeated except that no rubber was used or that either of the components ($b_2$) and ($b_4$) was not used. The results are shown in Table 1.

TABLE 1

| | ($b_1$) polyolefin | | ($b_3$) maleic anhydride | ($b_2$) rubber | | ($b_4$) rubber | | (C) barrier resin | adhesive strength | falling test |
|---|---|---|---|---|---|---|---|---|---|---|
| | type | pt. wt. | pt. wt. | type | pt. wt. | type | pt. wt. | | (kg/25 mmW) | (height: 11 m) |
| Ex. 1 | HDPE | 100 | 0.5 | polyisobutylene | 2 | polyisobutylene | 25 | nylon 6 | 74 | no abnormality |

TABLE 1-continued

| | (b-1) polyolefin | | (b-3) maleic anhydride pt. wt. | (b-2) rubber | | (b-4) rubber | | (C) barrier resin | adhesive strength (kg/25 mmW) | falling test (height: 11 m) |
|---|---|---|---|---|---|---|---|---|---|---|
| | type | pt. wt. | | type | pt. wt. | type | pt. wt. | | | |
| Ex. 2 | HDPE | 100 | 0.5 | polyisobutylene | 5 | polyisobutylene | 25 | nylon 6 | nearly completely broken (80) | no abnormality |
| Ex. 3 | HDPE | 100 | 0.5 | polyisobutylene | 15 | polyisobutylene | 10 | nylon 6 | 76 | no abnormality |
| Ex. 4 | HDPE | 100 | 0.5 | polyisobutylene | 25 | polyisobutylene | 5 | nylon 6 | 72 | no abnormality |
| Ex. 5 | HDPE | 100 | 0.2 | polyisobutylene | 5 | polyisobutylene | 25 | nylon 6 | 65 | no abnormality |
| Ex. 6 | HDPE | 100 | 3.0 | polyisobutylene | 5 | polyisobutylene | 25 | nylon 6 | 79 | no abnormality |
| Comp. Ex. 1 | HDPE | 100 | 0.5 | — | — | — | — | nylon 6 | 10 | peeling from nylon layer |
| Comp. Ex. 2 | HDPE | 100 | 0.5 | — | — | polyisobutylene | 25 | nylon 6 | 31 | peeling from nylon layer |
| Comp. Ex. 3 | HDPE | 100 | 0.5 | polyisobutylene | 25 | — | — | nylon 6 | 28 | peeling from nylon layer |
| Ex. 7 | HDPE | 100 | 0.5 | polyisobutylene | 5 | polyisobutylene | 25 | polycarbonate | 10 | |
| Comp. Ex. 4 | HDPE | 100 | 0.5 | — | — | — | — | polycarbonate | 5 | |
| Ex. 8 | HDPE | 100 | 0.5 | polyisobutylene | 5 | polyisobutylene | 25 | polyester | 5.0 | |
| Comp. Ex. 5 | HDPE | 100 | 0.5 | — | — | — | — | polyester | 0.5 | |
| Ex. 9 | HDPE | 100 | 0.5 | polyisobutylene | 5 | polyisobutylene | 25 | PVDC* | 5.0 | |
| Comp. Ex. 6 | HDPE | 100 | 0.5 | — | — | — | — | PVDC* | 0.5 | |
| Ex. 10 | HDPE | 100 | 0.5 | polyisobutylene | 5 | polyisobutylene | 25 | EVOH* | 20.0 | |
| Comp. Ex. 7 | HDPE | 100 | 0.5 | — | — | — | — | EVOH* | 0.5 | |
| Ex. 11 | LLDPE | 100 | 0.5 | polyisobutylene | 5 | polyisobutylene | 25 | nylon 6 | nearly completely broken (80) | |
| Ex. 12 | ULDPE | 100 | 0.5 | polyisobutylene | 5 | polyisobutylene | 25 | nylon 6 | nearly completely broken (80) | |

*PVDC: polyvinylidene chloride
EVOH: saponified ethylene-vinyl acetate copolymer The molding conditions and thickness ratio of the bottle are as follows:

Molding conditions

The molding was carried out by the use of a multilayer injection blow molding machine (screw diameter of the extruder for HDPE: 65mm, that of the extruder for N polymer: 40mm, that of the extruder for nylon: 50mm, a three-kind and five-layer die, mfd. by The Japan Steel Works, Ltd.) under the following conditions:

injection pressure: 80kg/cm$^2$
resin temperature: 230° to 240° C.
blow time: 180 sec
weight of tank: 4.3 to 4.5kg
minimum thickness of tank: 4mm thickness ratio of the resins of tank
HDPE(2.5mm)/N(0.1mm)-/PA(0.2mm)/N(0.1mm)/HDPE (2.5mm)

The produced bottle was examined as follows:

Falling test

The bottle was charged with 40l of water and fallen from a height of 1 m to observe the broken state thereof.

Adhesive strength

The sidewall of the bottle used in the falling test was cut into a test piece having a width of 25mm. This piece was examined for interlaminar peeling between the resin layers with a Tensilon at a peeling rate of 50mm/min at an angle of 180° to determine the peel strength. The interlaminar peel strength thus determined was regarded as the adhesive strength.

EXAMPLES 7 TO 10 AND COMPARATIVE EXAMPLES 4 TO 7

Laminated sheets each having the same laminated structure as that of the bottle prepared in Example 1 were prepared except that the nylon 6 was replaced by a polycarbonate, polyester, polyvinylidene chloride or EVOH resin and cut to obtain test pieces. These pieces were examined for adhesive strength. The results are shown in Table 1. As Comparative Examples, the same procedure as that described above was repeated except that no rubber was used. The results are also shown in Table 1.

EXAMPLES 11 AND 12

The same adhesive resin as that used in Example 1 was prepared except that the high-density polyethylene as the base resin was replaced by a linear low-density polyethylene (hereinafter abbreviated to "LLDPE") (density: 0.920g/cm$^3$, melt flow rate: 0.8g/10 min, trade name: Nisseki Linrex AF 1210, a product of Nippon Petrochemicals Co., Ltd.) or an ultra-low-density polyethylene (hereinafter abbreviated to "ULDPE") (density: 0.900g/cm$^3$, melt flow rate: 0.5g/10 min, trade name: Nisseki Softrex D 9005, a product of Nippon Petrochemicals Co., Ltd.). A sheet having a laminated structure wherein a layer of the above adhesive resin is sandwitched between a layer of nylon and a layer of a high-density polyethylene was prepared by press molding and cut to obtain a test piece. This piece was examined for adhesive strength. The result is shown in Table 1.

EXAMPLE 13

Various high-density polyethylene resins were prepared by the use of the same catalyst as that used in Example 1 and examined for applicability to a large-scale blow-molded bottle. The results are shown in Table 2.

Test methods

1. The density and MFR were determined according to JIS K 6760.

2. Die swell rate (abbreviated to "DSR")

Determined by extruding a molten resin through a die having a diameter (D) of 2mm, a length (L) of 40mm and a ratio of L/D of 20 at 210° C. with a Koka type flow tester mfd. by Shimadzu Corporation, CFT-500 and shown by a ratio of the diameter of the excluded product to that of the die at a shear rate of 100 sec$^{-1}$.

3. Melt tension (abbreviated to "MT")

A polymer molten in a cylinder having an inner diameter of 9.55mm at 190° C. was excluded through an orifice having a diameter of 2.10mm and a length of 8mm with a melt tension tester mfd. by Toyo Seiki Co., Ltd. at a constant rate (piston-depressing rate: 20mm/min). The excluded strand was examined for melt tension through a load cell. When the melt break of the strand occur before the number of revolutions reaches 100 rpm, the stress at the melt break was regarded as the above melt tension.

4. Environmental stress-crack resistance (ESCR)

Determined according to JIS K 6760.

A 10% by volume solution of Liponox NLC was used as a test solution and the time which had been elapsed until a half of the test pieces caused cracking was regarded as ESCR.

5. Tensile impact strength (abbreviated to "TIS")

Determined according to ASTM D 1822.

6. Surface roughness (observation with the naked eye)

A parison injected with a small-scale blow molding machine (screw diameter: 40mm) fitted with a die (die diameter: 34mm, core diameter: 30mm) at a molding temperature of 200° C. at an extrusion rate of 15g/sec was observed with the naked eye. A parison having a smooth surface is shown by "o", while one having irregularly roughened surface due to extremely impaired fluidity is shown by "x".

The results of the above tests revealed that the high-density polyethylene resins of Experimental Examples 1, 2 and 3 each gave a parison having a smooth surface and were excellent in moldability, while that of Experimental Example 4 having an N value of less than 1.8 caused melt fracture and that of Experimental Example 5 having an N value of 3.0 was poor in impact strength, thus both being unsuitable for the preparation of a large-scale blow-molded bottle.

Effect of the Invention

As described above, the blow-molded bottle according to the present invention is improved in the adhesive strength of a polyolefin resin to a barrier resin such as polyamide, in which the multi-layered blow-molded bottle according to the prior art is disadvantageous, and is excellent in stiffness and impact resistance, thus being useful particularly as a large-scale bottle such as a gasoline tank.

TABLE 2

| Experimental Example | Resin type | Density (g/cm$^3$) | MFR (g/10 min.) | N value (—) | DSR (—) | MT (g) | TIS (kgf·cm/cm$^2$) | ESCR (hr) | Surface roughness | Remarks |
| --- | --- | --- | --- | --- | --- | --- | --- | --- | --- | --- |
| 1 | HDPE | 0.951 | 0.15 | 2.15 | 1.55 | 12 | 195 | 65 | o | smooth surface good moldability and properties of article |
| 2 | HDPE | 0.950 | 0.33 | 2.34 | 1.63 | 10 | 121 | 67 | o | smooth surface, good moldability and properties of article |
| 3 | HDPE | 0.950 | 0.03 | 2.30 | 1.58 | 30 | 400 | 250 | o | smooth surface, good moldability and properties of article |
| 4 | HDPE | 0.963 | 2.50 | 1.65 | MF. | 3.5 | 63 | 2.5 | x | low MT, poor moldability due to drawdown of parison |
| 5 | HDPE | 0.951 | 0.20 | 3.0 | 1.55 | 12 | 60 | 70 | o | low impact strength, poor properties of article |

(MF.: failure in measurement owing to melt fracture)

What is claimed is:

1. A multi-layered blow-molded bottle comprising at least two layers of a polyolefin resin (A), at least two layers of an adhesive resin (B) prepared by melt-reacting an olefin polymer (b$_1$) with a rubber (b$_2$) and an unsaturated carboxylic acid or a derivative thereof (b$_3$) in the presence of an organic peroxide to obtain a product and adding a rubber (b$_4$) to the product to melt-mix them with each other, at least one layer of a barrier resin (C) selected from the group consisting of polyamide, polycarbonate, polyester, polyvinylidene chloride and saponified ethylene-vinyl acetate polymer resins, which are laminated in the order of A/B/C/B/A and further comprising at least one layer of a resin composition consisting essentially of components (A) (B) and (C); said resin composition derived from the laminate A/B/C/B/A;

wherein said at least one layer of a resin composition consisting essentially of components (A) (B) an (C) is formed from rejected products or burrs generated in molding of the bottle; and wherein the adhesive resin (B) is prepared by melt-reacting 100 parts by weight of the olefin polymer (b$_1$) with 0.5 to 50 parts by weight of the rubber (b$_2$) and 0.05 to 10 parts by weight of the unsaturated carboxylic acid or derivative thereof (b$_3$) in the presence of the organic peroxide to obtain the product and adding 0.5 to 50 parts by weight of the rubber (b$_4$) per 100 parts by weight of the product to melt-mix them with each other.

* * * * *